United States Patent [19]

Cunningham et al.

[11] 4,388,965
[45] * Jun. 21, 1983

[54] AUTOMATIC THERMAL SWITCH

[75] Inventors: Joseph W. Cunningham, Rockville; Lawrence D. Wing, Bowie, both of Md.

[73] Assignee: The United States of America as represented by the Administrator of the National Aeronautics and Space Administration, Washington, D.C.

[*] Notice: The portion of the term of this patent subsequent to Aug. 4, 1998, has been disclaimed.

[21] Appl. No.: 106,192

[22] Filed: Dec. 21, 1979

[51] Int. Cl.³ .............................................. G05D 23/00
[52] U.S. Cl. .................................... 165/32; 165/76; 165/185
[58] Field of Search ............................ 165/32, 185, 76

[56] References Cited

U.S. PATENT DOCUMENTS

| 1,054,926 | 3/1913 | Mantius | 122/34 |
|---|---|---|---|
| 1,652,793 | 12/1927 | Perry | 165/32 |
| 1,815,570 | 7/1931 | Jones | 165/185 |
| 2,994,203 | 8/1961 | Lackey et al. | 165/185 |
| 3,112,878 | 12/1963 | Snelling | 165/32 |
| 3,229,755 | 1/1966 | Komarow | 165/32 |
| 3,437,132 | 4/1969 | Venema | 165/185 |
| 3,520,734 | 7/1970 | Scheve et al. | 165/32 |
| 4,182,379 | 1/1980 | Lestak et al. | 165/185 |
| 4,281,708 | 8/1981 | Wing et al. | 165/32 |

Primary Examiner—Larry Jones
Attorney, Agent, or Firm—John O. Tresansky; John R. Manning; Robert D. Marchant

[57] ABSTRACT

An automatic thermal switch to control heat flow includes a first thermally conductive plate 2, a second thermally conductive plate 25 and a thermally conductive switch saddle 1 pivotally mounted to the first plate 2. A flexible heat carrier 27 is connected between the switch saddle 1 and the second plate 25. A phase-change power unit 9, including a piston 13 coupled to the switch saddle 1, is in thermal contact with the first thermally conductive plate 2. A biasing element 21 biases the switch saddle 1 in a predetermined position with respect to the first plate 2. When the phase-change power unit 9 is actuated by an increase in heat transmitted through the first plate 2, the piston 13 extends and causes the switch saddle 1 to pivot thereby varying the thermal conduction between the first and second plates 2 and 25 through the switch saddle 1 and flexible heat carrier 27. The biasing element, switch saddle and piston can be arranged to provide either a normally closed or normally opened thermally conductive path between the first and second plates.

12 Claims, 6 Drawing Figures

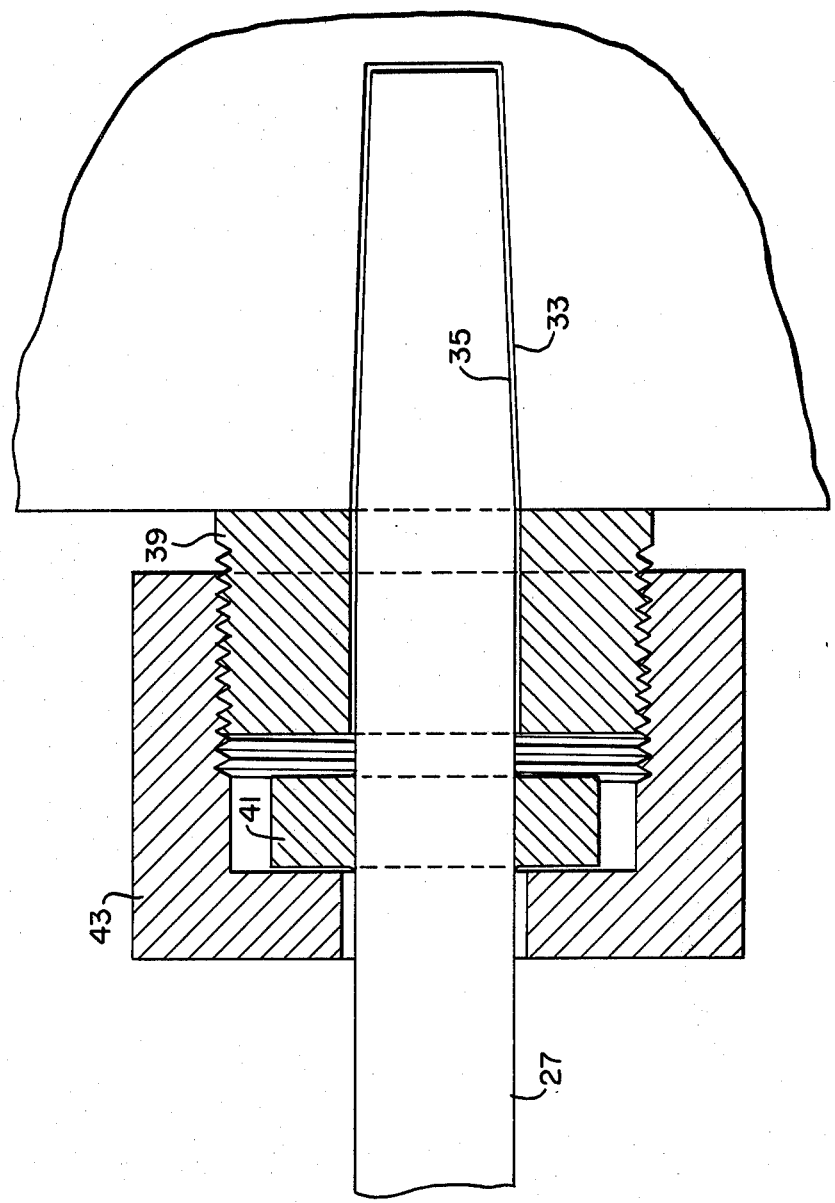

AUTOMATIC THERMAL SWITCH

ORIGIN OF THE INVENTION

The invention described herein was made by employees of the U.S. Government and may be manufactured and used by or for the Government for governmental purposes without the payment of any royalties thereon or therefor.

DESCRIPTION

1. Technical Field

The present invention relates to thermal switches and more particularly to an automatic thermal switch for selectively varying the heat transfer between two separate temperature environments.

In many areas of modern technology, such as cryogenics refrigeration, spacecraft, and electronics, it is desirable to control the flow of heat from one area or object to another. For example, in space vehicles it is often necessary to absorb or reject heat from the environment to achieve a desired thermal control over temperature sensitive items (e.g., semi-conductor circuitry) in a payload. A direct and fixed heat path between the environment and payload items is often not acceptable because when the spacecraft field of view is full sun, the amount of heat flow to the payload items can be so great that the items are destroyed. Similarly, when the spacecraft field of view is deep space, the loss of heat, by black body radiation, from the items can be so large that the items become inoperative.

2. Background Art

Two common prior art devices used for thermal control in spacecraft are louvers and an opening and closing cover plate (lid). The exposed surface of either the louvers or the lid has, for example, a low absorptivity, high emissivity surface coating which rejects incoming radiation from the sun and enhances the heat radiated from the surface, effectively preventing overheating of a heat-producing, temperature sensitive payload item. The louvers, or lid, are open to expose a radiating plate having a low emissivity to space when the spacecraft field of view is deep space. In this way, the internally produced heat can be rejected, but in a controlled manner, such that the payload item does not get excessively cold. Both the lid and louver system are analogous to providing a surface with variable absorption and emission properties.

The chief disadvantage of the lid or louver systems is that they are susceptible to physical damage because they must be affixed to an exterior spacecraft surface. Another disadvantage lies in the magnitude of mechanical motion involved with opening and closing the louvers or lid which produces unwanted force reactions and tends to increase the probability of improper or imcomplete functioning. A third disadvantage is that there is still some radiative heat loss from the louvered system when exposed to deep space which necessitates the use of onboard heaters to maintain equipment at operating temperatures. Finally, the need for lids or louvers which cover the entire radiating surface area often results in a system which is heavier than an equivalent number of thermal switches.

Thermal switches have been proposed to vary the thermal conductivity or rate of heat transfer between one area or object and another. One such thermal switch is in contact with a cold plate and includes a sealed extendable bellows containing a flexible wick and a thermally conductive plate carried by the bellows. Freon is encased within the bellows which, along with the flexible wick, acts as a heat pipe. Heat from a cold plate is transmitted to the freon which evaporates and causes the bellows to expand. The expansion of the bellows causes the conductive plate to contact a hot plate so that heat is transferred between the plates.

Another type of thermal switch includes a thermal actuator in contact with a sensor block. A piston extends from the actuator into a cup in a heat sink. The piston is biased by a pair of springs to keep the piston from contacting the heat sink during normal operation. Heat transferred to the actuator from the sensor block causes the piston to extend into the cup in contact with the heat sink while compressing the springs. Thus, heat can flow from the heat sink and sensor block.

Another prior art type of thermal switch variably conducts heat between a heat source plate and a heat sink plate. A plurality of bellows are attached to the heat source plate through conductive spacers. The bellows contain an expandable fluid and carry a thermally conductive plate which is disposed between the two plates. As the heat source temperature rises the fluid within, the bellows expands to cause the thermally conductive plate to contact the heat sink plate so that heat is transferred between the plates.

A further prior art type thermal switch employs a sealed pressurized bellows which acts as a spring to separate an upper contact plate which acts as a heat sink and a lower plate which is thermally coupled to the heat source. A thermal actuator in contact with the heat source has a piston linked to the lower plate. Heat transferred to the actuator from the heat source causes the piston to extend and to compress the bellows bringing the upper and lower plates into contact, thus allowing heat to be transferred therebetween.

The aforementioned prior art thermal switches have proved to be unreliable in operation in highly vibrating environments such as spacecraft, and uneconomical to produce in large quantities because of their complexity. In addition, thermal switches have heretofore been of the normally "open" type (low thermal conductivity), with a heat path being provided between a pair of plates only when it is desired to have a "closed" (high thermal conductivity) heat path.

A previous invention of ours for an automatic switch, which is the subject of U.S. patent application Ser. No. 06/043,943, filed May 30, 1979, now U.S. Pat. No. 4,281,708, attempted to overcome the problems of the prior art. This previous automatic thermal switch includes first and second spaced thermally conductive plates with a thermally conductive armature pivotally mounted to the first plate. A phase-change power unit, including a piston connected to the armature, is in thermal contact with the first thermally conductive plate. A biasing element, connected to the armature, biases the armature in a predetermined position with respect to the first and second plates. When the phase-change power unit is actuated by an increase in heat transmitted through the first plate, the piston extends and causes the armature to pivot to vary the thermal conduction between the first and second plates through the armature. The biasing element, armature and piston can be arranged to provide either a normally closed or normally opened thermally conductive path between the first and second plates.

Although our previous invention overcomes many of the problems of the prior art, our present invention affords still greater improvements in thermal conduction efficiency, the ability to withstand greater relative motion between the plates and the flexibility of uses to which thermal switches may be employed.

Accordingly, an object of the present invention is to provide a new automatic thermal switch that is simple, reliable, highly efficient and lightweight.

It is another object of this invention to provide an automatic thermal switch which is highly versatile and can be easily adapted to accommodate a wide variety of heat transfer situations.

It is another object of this invention to provide an automatic thermal switch which can be arranged to provide either a normally low thermally conductive heat path or a normally high thermally conductive heat path.

It is another object of this invention to provide a plurality of thermal switches that selectively provide a desired amount of thermal conductivity between two areas.

It is a further object of the invention to provide one or more thermal switches that can control the capacity as well as direction of heat flow.

It is another object of this invention to provide an automatic thermal switch that is entirely internal to a space package and thus less vulnerable to physical damage.

STATEMENT OF INVENTION

Briefly, these and other objects are achieved with a thermal switch for selectively varying the heat transfer between two separate temperature environments. First and second thermally conductive spaced members have surfaces exposed to separate temperature environments. A heat motor is in heat exchange relationship with the first spaced member. A thermally conductive switch saddle is pivotally mounted to the first member. The switch saddle is responsive to the heat motor so that the switch saddle is pivoted between first and second positions in response to the amount of heat absorbed by the heat motor from the first spaced member. The switch saddle in contact with the first spaced member in the first position is to provide a high thermal conductivity path therebetween and the switch saddle being spaced from the first space member in the second position is to provide a substantially low thermal conductivity path therebetween. A flexible heat carrier is thermally coupled to the switch saddle and to the second spaced member for completing a heat transfer path between the first and second spaced members.

The thermal switches of the present invention are simpler and more reliable than prior art switches, especially when used in high vibration environments such as spacecraft, because the flexible heat carrier accommodates greater relative motion between the first and second plates. In addition, the use of the flexible heat carrier removes all net forces acting to separate the two plates. All bearing forces are self-contained within the switch elements attached to the first conductive plate. The use in this invention of one contact joint instead of two, as in our previous invention, affords greater conductive efficiency and also permits increased bearing pressure at the contact surface. Thermal switches of this invention can be used in either a normally opened or normally closed version and either type of switch is completely automatic in operation because each switch contains a self-contained power source (heat motor). The thermal switches can be varied in heat capacity, number and arrangement according to the amount and direction of thermal conduction required between the first and second plates. In addition, when used in spacecraft to control heat flow the thermal switches can be placed between a pressurized equipment bay and spacecraft skin, thereby eliminating the need to expose the equipment bay or the contents to a vacuum as occurred in the prior art when louvers were used to control the equipment bay temperature.

Other objects, features, and advantages of the invention are presented in the following detailed description of the invention when taken in conjunction with the accompanying drawings.

BRIEF DESCRIPTION OF THE DRAWINGS

In the drawings like parts are designated by the same references.

FIG. 2 is a cross-sectional view of a quick disconnect connector for the flexible heat carrier;

DETAILED DESCRIPTION OF THE INVENTION

Figure 1A:
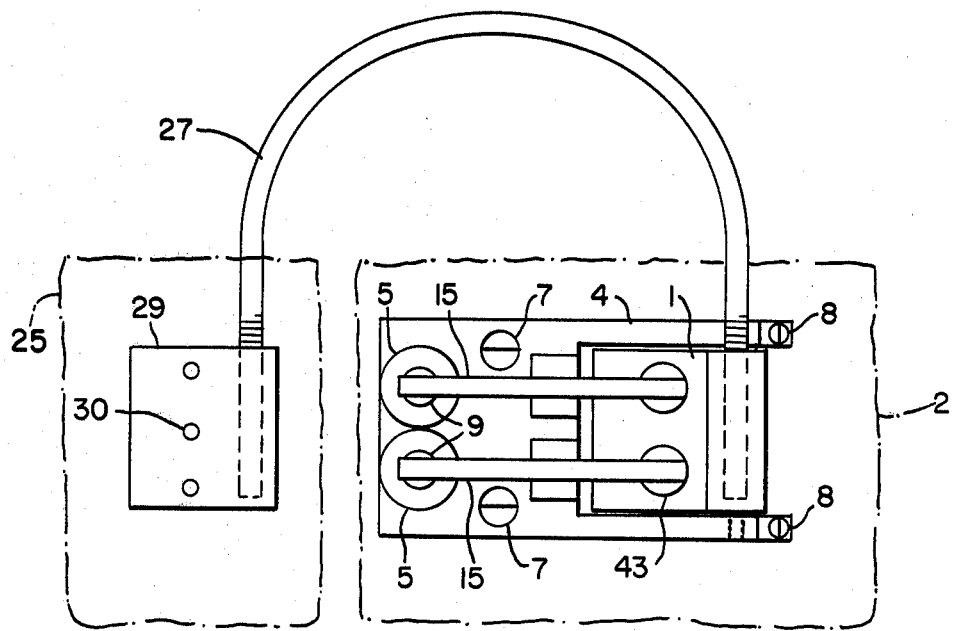
FIGS. 1a and 1b are top and side views of one embodiment of the thermal switch employing the principles of the present invention when the switch is in the normally open position.
Figure 1B:
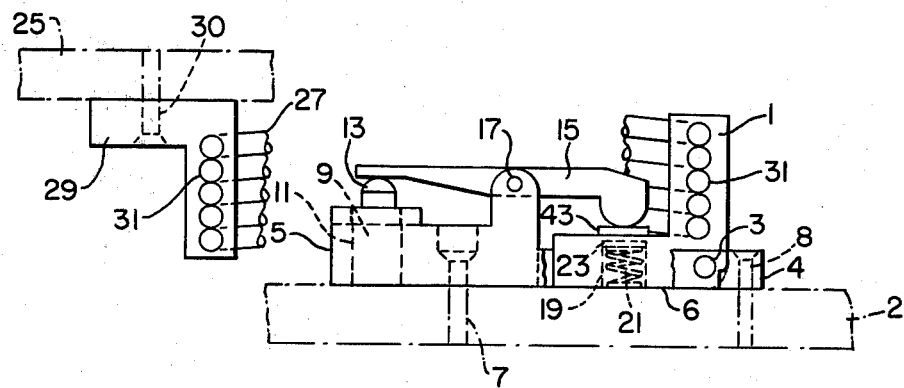

FIGS. 1a and 1b illustrate one embodiment of a thermal switch constructed according to the principles of the present invention wherein switch saddle 1 is mounted to a first thermally conductive plate 2 by insulated pivot pin 3 and pin support 4. Pin support 4 is mounted to plate 2 by fastener 8. A frame or support 5 is mounted to plate 2 by fastener 7 and houses a phase-change piston-type power unit 9 which slidingly fits into annular bore 11 in frame 5. Phase-change power unit 9 is in good thermal contact with plate 2 and is in effect in heat exchange relationship with the temperature environment to which plate 2 is exposed. Phase-change power unit 9 includes a piston 13 which is in driving relationship to linkage arm 15 pivotally mounted to frame 5 at 17. The switch saddle 1 includes an annular bore 19 in which is seated compression spring 21 against thermal insulating washer 23. Spring 21 normally biases switch saddle 1 in a noncontacting position with respect to plate 2. As illustrated, however, switch saddle 1 is in a closed position, the thermal contact joint being identified at 6.

Switch saddle 1 is thermally coupled to a second thermally conductive plate 25 by flexible heat carrier 27 and attachment block 29 which is connected to plate 25 by fastener 30.

Flexible heat carrier 27 may comprise a simple copper wire cluster or cable which is covered by a loose wrapping of asbestos tape and a second wrapping of reflective, low-emittance aluminum tape. FIG. 1b shows five such clusters, however, any suitable number may be employed to accommodate the desired heat capacity. Where weight considerations are a factor and higher heat capacities are required, two-way flexible heat pipes may be employed in place of the copper wire clusters. One-way flexible heat pipes may also be used where an additional control mode is desired. The flexible heat carrier 27 may be attached directly to the switch saddle 1 and attachment block 29 by braising the ends 31 to annular surfaces provided in the switch saddle and attachment block. Preferably, however, the heat carrier may be adapted for quick disconnect with screw-on plug-ends as shown in FIG. 2.

Referring momentarily to FIG. 2, it may be seen that the quick disconnect connection includes a tapered opening 33 in the attachment block or switch saddle for receiving a tapered end 35 of a flexible heat carrier 27. Both tapers may be approximately 2°. Thermal grease is preferably coated onto the ends of the heat carrier prior to insertion in order to assure a good thermal contact with the attachment block or switch saddle. The quick disconnect connector further includes a threaded brass collar 39 braised to the attachment block or switch body in registration with the opening for receiving a tapered end of the heat carrier, metal ring 41 braised to the heat carrier as shown, and nut 44 for engaging the threads of collar 39. When nut 44 is screwed down on collar 39 pressure is exerted on ring 41 which pushes tapered end 35 snugly into the tapered surface 33 to ensure good thermal contact. Although this type of connection is preferred, any suitable conventional quick disconnect connector may be used.

Returning now to FIGS. 1a and 1b, the phase-change power unit 9 is of a type well known in the art. Such devices include an internal reservoir containing a substance which undergoes a phase-change from liquid or solid to gas at a temperature particular to the substance. For example, the phase-change substance may be ammonia, Freon, or deionized water. Normally such materials are maintained in a fluid or solid state within the power unit. Heat transferred from the plate 2 to power unit 9 causes the phase-change material to undergo a phase-change from liquid or solid to gas, which in turn causes piston 13 to be extended.

The switch saddle 1 and attachment block 29 are preferably made of a material having a very high thermal conductivity, such as copper. In turn, frame 5, thermally conductive plate 2 and the other thermally conductive plate 25 are preferably made of a material having a high conductivity, such as aluminum. The surface of plate 2 that engages frame 5 is coated with a thermal grease to insure good thermal contact and heat exchange with the power unit 9. The linkage arm 15 may be machined from any suitable rigid material such as stainless steel. In order to assure that no heat is transferred through the linkage arm to the switch saddle in the open position, an insulation pad 43 is provided at the point where the linkage arm 15 engages the switch saddle.

In operation, the embodiment of the thermal switch shown in FIGS. 1a and 1b are in an open condition so long as the temperature of the plate 2 remains below the phase-change temperature of the power unit 9. In this condition, the working substance of the power unit is condensed, fully retracting the piston 13. The compression spring 21 thus lifts the switch saddle, breaking the thermal connection between plates 2 and 25. It is noted that the separation between the switch saddle 1, and plate 2 need only be slight, on the order of thousandths of an inch, in order to break the thermal connection.

When the temperature of the environment to which plate 2 is exposed causes plate 2 to heat up to a temperature at or above the phase-change temperature, piston 13 extends driving linkage arm 15 about pivot 17 to force the switch saddle 1 into thermal contact with plate 2 thereby closing the thermal path. To assure adequate bearing force of the switch saddle against plate 2 and thus assuring good thermal contact, it is preferred that the compression spring force be not more than 10% of the force provided by the phase-change power unit. A typical force exerted by a commercially available phase-change power unit is about 50 psi, although this value varies with the phase-change material selected.

When the switch is in the closed position, a high thermal conduction path is set up between plates 2 and 25 through switch saddle 1, flexible heat carrier 27 and attachment block 29.

When the temperature of plate 2 drops below the phase-change temperature of the power unit 9, the piston 13 retracts due to the condensation of the working substance in the power unit and the pressure exerted by the compression spring 21 through linkage arm 15. Thermal contact between the switch saddle and the plate 2 is then broken, resulting in little or no heat transfer between plates 2 and 25.

Figure 3A:
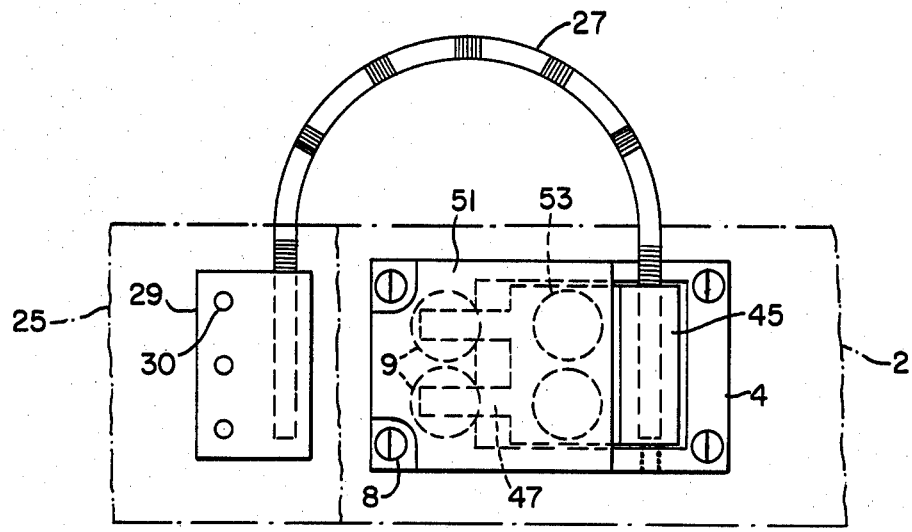
FIGS. 3a and 3b are top and side views of a second embodiment of the thermal switch employing the principles of the present invention in the normally closed position.
Figure 3B:
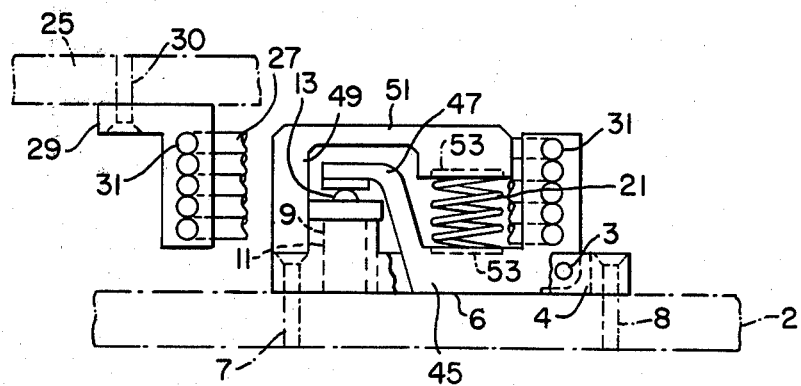

A second embodiment of the invention is shown in FIGS. 3a and 3b. In this embodiment the thermal switch is designed to provide a normally closed (high thermal conduction) path between plates 2 and 25. The arrangement of elements is similar to that of FIGS. 1a and 1b with the exception that switch saddle 45 has an arm 47 which is directly engaged by the piston 13 of heat motor 9. In addition, frame 49 has an arm 51 which bears against compression spring 21. The other end of compression spring 21 pushes against switch saddle 45 in a manner to bias switch saddle 45 in a normally contacting position with respect to plate 2. Insulators 53 at either end of compression spring 21 cut off the alternate heat path through the frame 49, 51 to the switch saddle 45.

Thus, when plate 2 is below the phase-change temperature of heat motor 9 the switch is in the closed position setting up a high thermal conduction path between plates 2 and 25 through switch saddle 45, flexible heat carrier 27, and attachment block 29. When the temperature of plate 2 rises above the phase-change temperature of heat motor 9, the phase-change substance expands to push piston 13 out against arm 47 which separates switch saddle 45 from plate 2. In this embodiment, the compression spring 21 preferably provides a load equivalent to about 90% of the total force provided by the phase-change power unit 9.

In some cases the use of two or more phase-change power units per switch may be required to assure that the switch "closing" load will be sufficient to assure a bearing stress at the saddle make/break contact surface 6 of at least 40 psi.

Figure 4:
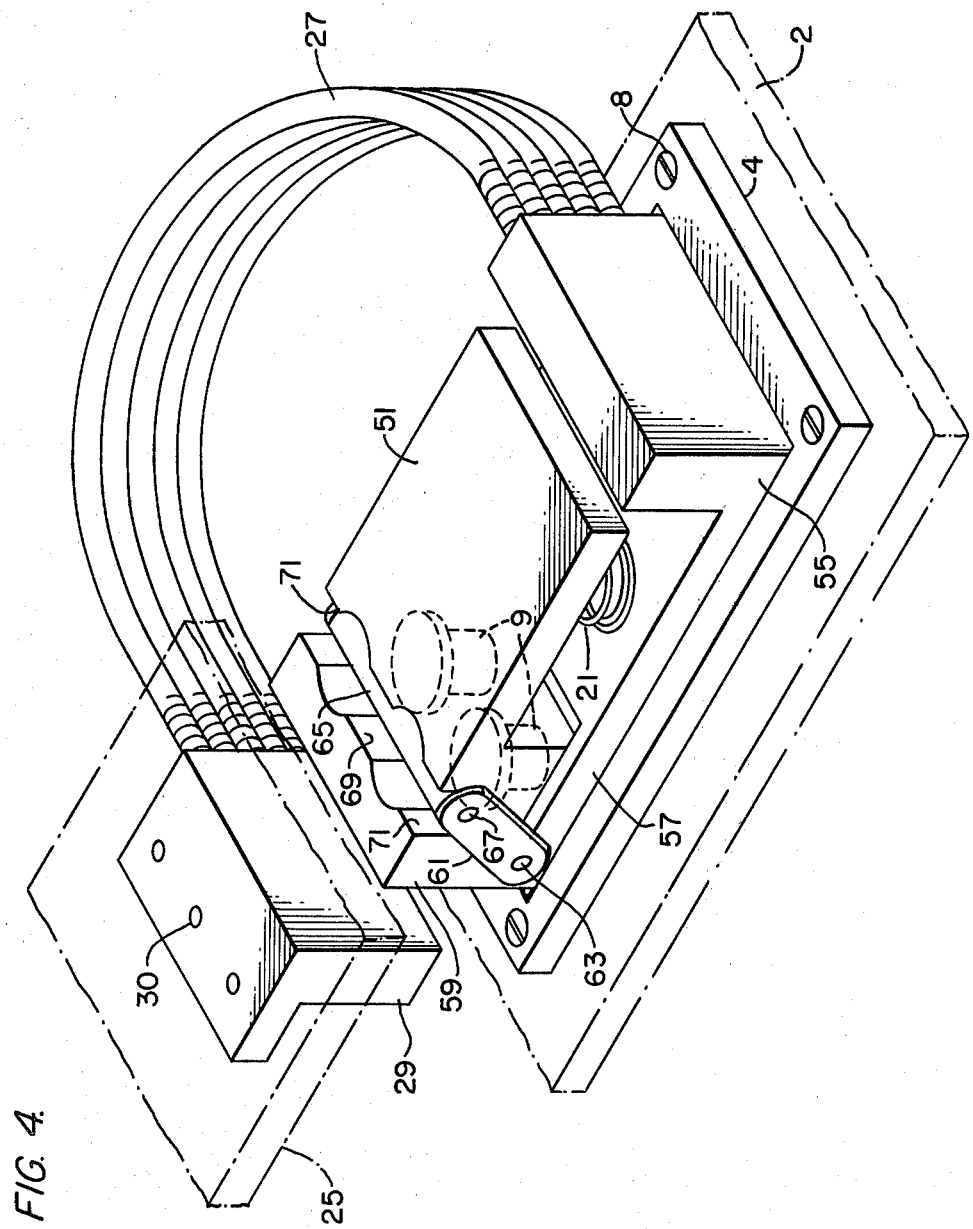
FIG. 4 illustrates an alternative embodiment of the normally closed thermal switch of FIGS. 3a and 3b.

FIG. 4 illustrates an alternative embodiment of the switch shown in FIGS. 3a and 3b in the normally closed position. FIG. 4 also illustrates for clarity how two phase-change power units may be employed with a single switch. More specifically, the embodiment of FIG. 4 is similar in construction and operation to the embodiment of FIGS. 3a and 3b except that the pistons of power units 9 do not directly engage the arm of the switch saddle. Rather, the switch saddle 55 has two arms 57 which straddle the frame 59 housing the two power units 9. Switch saddle arms 57 are pivotally connected to linkage 61 by pins 63. Linkages 61 are connected at their other end to rod 65 by pivot pins 67.

Rod 65 is positioned in slot 69 formed by the walls 71 formed in frame 59. Compression springs 21 are positioned between arm 51 of frame 59 and the switch saddle so that the switch saddle, as in FIG. 3, is normally biased in a contacting relationship with plate 2.

Upon the increase of temperature of plate 2 above the phase-change temperature of the power units 9, pistons 13 (not shown in FIG. 4) will extend, pushing rod 65 vertically in slot 69. An upward force is exerted upon switch saddle arms 57 through linkages 61 causing switch saddle 55 to separate from plate 2 breaking the thermally conductive path between plates 2 and 25.

It should be apparent that the thermal switch of the present invention is readily adaptable to widely varying thermal requirements. For example, although the drawings illustrate five heat carriers, the number actually used will vary to achieve the desired heat carrying capacity of the switch for each application. The heat carrying capacity can be further varied by using heat pipes instead of copper wire clusters, by varying the number of switches or by any combination of these. The switch activation temperature can be selected by specifying the appropriate phase-change material in the power unit. The switch closing force is controlled by the number of phase-change capsules. Additional control capability is provided by the option of one-way or two-way flexible heat pipes or by coating the exposed surfaces of the termally conductive plates 2 and 25 with materials of different coefficients of solar absorptivity and infrared emissivity.

To illustrate the use of a normally open thermal switch of the type illustrated in FIGS. 1a and 1b, assume that thermally conductive plate 25 is exposed to deep space in a near earth orbit. The switch is fixed to plate 2. When plate 2 is heated (by internal spacecraft power sources) to a temperature just in excess of the phase-change temperature of the power unit 9, the switch closes and heat flows from plate 2 to plate 25 from which it is dumped by radiation to deep space. When plate 2 eventually loses enough heat to drop its temperature below the phase-change temperature, then the switch opens and the heat flow to space is cut off. This prevents the payload items attached to plate 2 from becoming too cold as would almost certainly occur if plate 2 radiated directly to space.

If plate 25 in this case were exposed to the sun and its surface were bare aluminum (solar absorptivity of 0.15 and infra-red emissivity of 0.04) its equilibrium temperature would be 450° F. This would cause a high heat flow back from plate 25 to plate 2 and, unless a one-way heat pipe were used, there would be no stopping the heat flow until plate 2 approached the intolerably high 450° F.

If, on the other hand, the exposed surface of plate 25 were painted white (solar absorptivity of 0.32 and infra-red emissivity of 0.86) then the hottest possible temperature of plate 25 from solar heating would be 95° F. In this case, the heat backflow through the switch in the closed condition would be limited to 95° F., a more tolerable environment.

Consider the case in which it is desired to control plate 2 to a maximum phase-change temperature and no minimum temperature specifications for plate 2 apply. Consider further that it is desired to dump heat to space whenever possible, that is when the control plate does not "see" the sun. In this case, a normally closed type switch such as illustrated in FIGS. 3a and 3b or 4 would be bolted to plate 2, which in this example, would be exposed to the uncontrolled temperature environment of space. The other plate 25 would be exposed to the payload package. When the temperature of plate 2 drops below the phase-change temperature, the switch is closed and heat can flow in either direction assuming a two-way heat carrier is used. When plate 2 looks at deep space with no sun, its temperature is very cold and, the switch being closed, heat will flow from plate 25 to plate 2 and thence to space. When plate 2 "sees" the sun, its temperature rises, finally exceeding the phase-change temperature and thus opening the thermal switch and stopping the heat flow. Moreover, the system in this case dumps heat to space selectively, the switch being closed only when plate 2 does not see the sun. This precludes any reverse heat flow when plate 2 is sun-exposed.

It will be evident to one skilled in the art that the possible combinations of control and capacity is very large, representing permutations of three carrier types, one to five carriers per switch and up to the number of switches and combination of switches that space or weight limitations in any given application will permit.

Moreover, because of the design of this invention the relative motion between plates 2 and 25 can be at least plus or minus 0.5 inches in each of three mutually perpendicular directions. In addition, the planes of the two plates can easily be varied by plus or minus 10°. Accordingly, the thermal switch of this invention is substantially unaffected by relative motion between the plates due to, for example, vibratory and static and dynamic load-induced deflections.

Although the thermal switch of the present invention has been described in the context of a space application, other uses of the above described thermal switch, such as in the fields of cryogenics, electronic packaging, or solar heating, will be apparent to those skilled in the art.

While the automatic thermal switch of the present invention has been described in considerable detail, it is understood that various changes and modifications may occur to persons of ordinary skill in the art without departing from the spirit and scope of the invention as defined in the appended claims.

We claim:

1. A thermal switch for selectively varying the heat transfer between two separate temperature environments, comprising:

first and second thermally conductive spaced members, respectively having surfaces exposed to two separate temperature environments;

a heat motor being in heat exchange relation with said first spaced member;

a thermally conductive switch saddle spatially separated from said second member and pivotally attached to said first member, said switch saddle being responsive to said heat motor so that said switch saddle is pivoted relative to said first member between first and second positions in response to the amount of heat absorbed by said heat motor from said first spaced member, said switch saddle in direct contact and providing a high thermal conductivity contact joint with only said first one of said spaced members when in said first position and said switch saddle being spaced from said first spaced member thereby opening only said high thermal conductivity contact joint when in said second position; and flexible heat carrier means thermally coupled to said switch saddle and to said spaced member for completing a flexible, fixed conductive heat transfer path between said switch saddle and second spaced member.

2. The thermal switch of claim 1 wherein said switch saddle is normally disposed in one of said first or second positions, and wherein said heat motor drives said switch saddle into the other of said positions in response to a temperature increase in said first spaced member.

3. The thermal switch of claim 2 including means for biasing said switch saddle in one of said first or second positions.

4. The thermal switch of claim 1 wherein said heat motor includes a phase-change power unit coupled between said first spaced member and said switch saddle.

5. The thermal switch of claim 1 wherein said flexible heat carrier means comprises one or more copper wire clusters.

6. The thermal switch of claim 1 wherein said flexible heat carrier means comprises one or more flexible heat pipes.

7. The thermal switch of claim 1 including means for quickly disconnecting said flexible heat carrier means from said switch saddle and said second spaced member.

8. A thermal switch for selectively varying the heat transfer between two separate temperature environments, comprising:

first and second thermally conductive spaced members respectively having surfaces exposed to two separate temperature environments;

a thermally conductive switch saddle spatially separated from said second member and pivotally attached to said first one of said spaced members and providing a contact joint in direct thermally conductive contact with only said first one of said spaced members when said switch saddle is pivoted against said first one of said spaced members;

means for providing a flexible fixed, thermally conductive heat transfer path between said switch saddle and said second spaced member;

means for biasing said switch saddle in a predetermined position with respect to said first thermally conductive member; and means, in heat exchange relation with said first one of said thermally conductive spaced members and coupled to said switch saddle, for driving said switch saddle against said biasing means in response to a temperature change in said first thermally conductive spaced member to change the thermal conductivity across said contact joint thereby varying only the thermal conduction between said first and second thermally conductive spaced members across said contact joint.

9. The thermal switch of claim 8 wherein said driving means comprises a phase-change power unit, said power unit including a piston coupled to said switch saddle.

10. The thermal switch of claim 8 wherein said flexible heat carrier means comprises one or more copper wire clusters.

11. The thermal switch of claim 8 wherein said flexible heat carrier means comprises one or more flexible heat pipes.

12. The thermal switch of claim 8 wherein said means for providing a flexible heat transfer path is coupled to said switch saddle and said second spaced member by a quick disconnect mechanism.

* * * * *